United States Patent [19]

Sommers

[11] 4,193,525

[45] Mar. 18, 1980

[54] BICYCLE ATTACHED BEVERAGE CONTAINER CARRIER

[76] Inventor: Garold L. Sommers, 1770 Whitney, Idaho Falls, Id. 83401

[21] Appl. No.: 922,362

[22] Filed: Jul. 5, 1978

[51] Int. Cl.$^2$ .................... B65D 11/02; B62J 7/02
[52] U.S. Cl. .................... 224/35; 224/273; 224/42.46 R; 206/430; 220/445; 220/902
[58] Field of Search ............... 224/35, 29 B, 42.46 R, 224/26 R, 32 R, 30 R, 39, 29 R, 42.45 R; 280/202, 289 R; 206/445, 430, 427, 523, 524; 220/444, 446, 445, 447, 902

[56] References Cited

U.S. PATENT DOCUMENTS

| 570,923 | 11/1896 | Goodspeed | 224/35 |
|---|---|---|---|
| 3,131,842 | 5/1964 | Dingle et al. | 224/29 B |
| 3,313,508 | 4/1967 | Mancl | 224/29 B X |
| 3,578,199 | 5/1971 | Duncan | 224/26 R X |
| 3,844,459 | 10/1974 | Chambers | 224/29 B |
| 4,062,584 | 12/1977 | Pinkham et al. | 224/46 R X |

*Primary Examiner*—Jerold M. Forsberg
*Attorney, Agent, or Firm*—Clarence A. O'Brien; Harvey B. Jacobson

[57] ABSTRACT

A small personal size carrier is provided for containing and insulating elongated beverage containers against ambient heat transfer relative thereto. The carrier comprises loosely telescopingly related inner and outer cylindrical shells defining an annular space between the opposing outer and inner surfaces thereof and the shells have radially registered substantially rectangular openings formed through corresponding wall portions thereof intermediate the opposite ends of the shells and with the openings oriented longitudinally of the shells. One of the shells includes generally radially projecting integral flanges extending about the corresponding opening and at least substantially bridging the radial spacing between the aforementioned wall portions. The inner and outer shells include spaced end and closure walls, respectively, closing the opposite ends thereof and foam insulation is disposed between the opposing outer and inner surfaces of the shells and end and closure walls and a heat insulative partial cylindrical door is hingedly supported from the carrier and is swingable between open and closed positions providing unobstructed access through and closing, respectively, the aforementioned openings.

7 Claims, 8 Drawing Figures

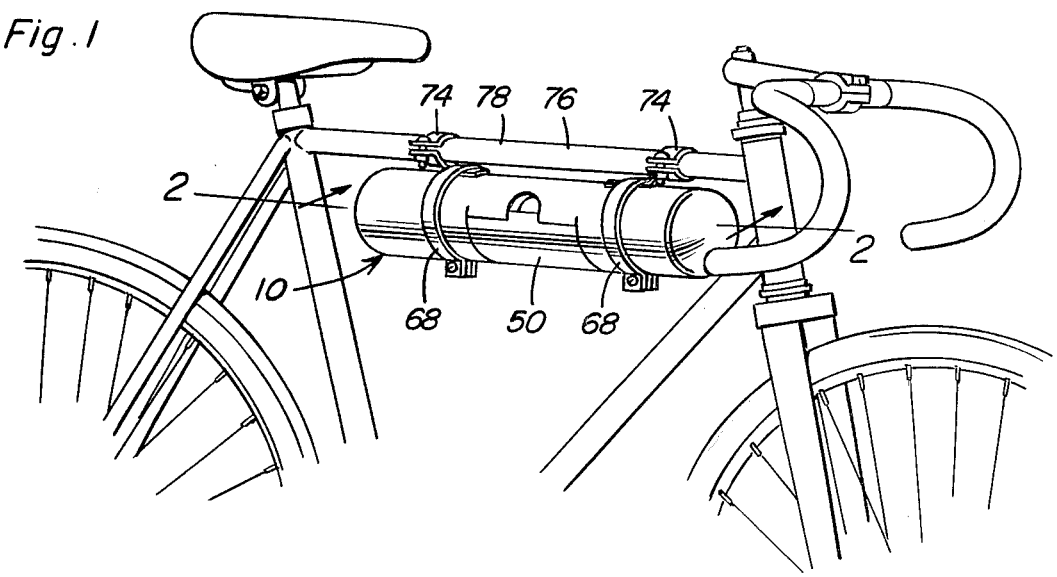
Fig. 1
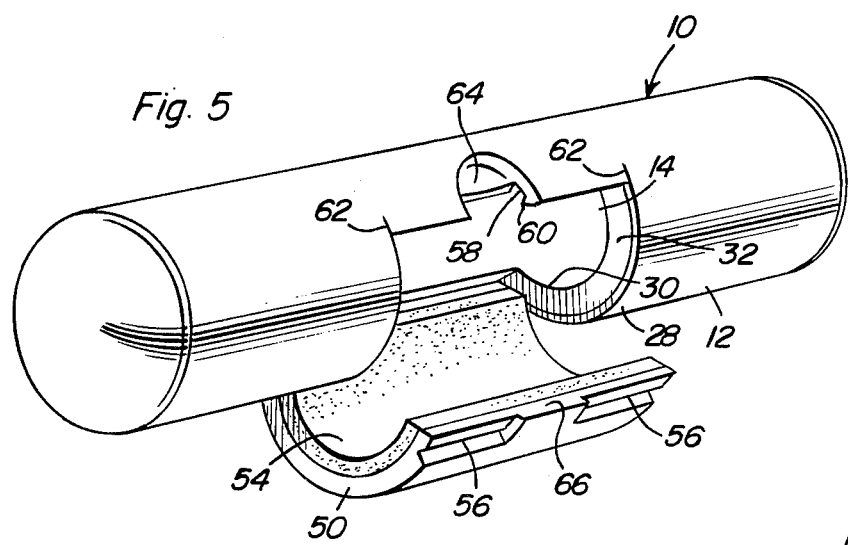
Fig. 5
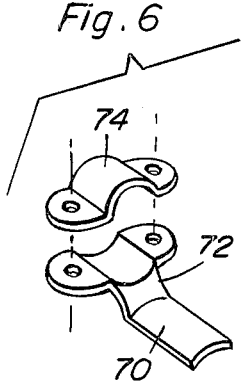
Fig. 6
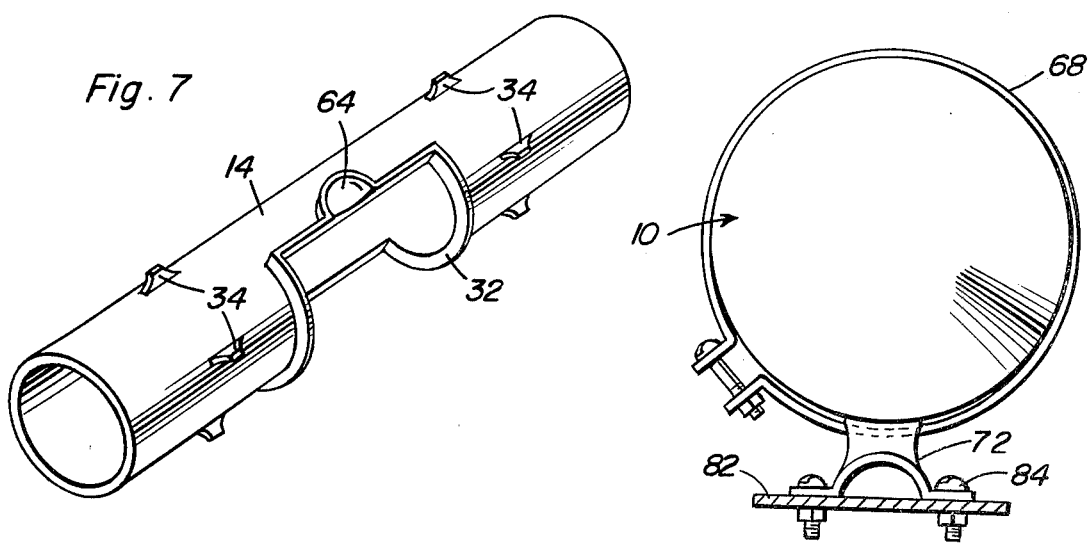
Fig. 7
Fig. 8

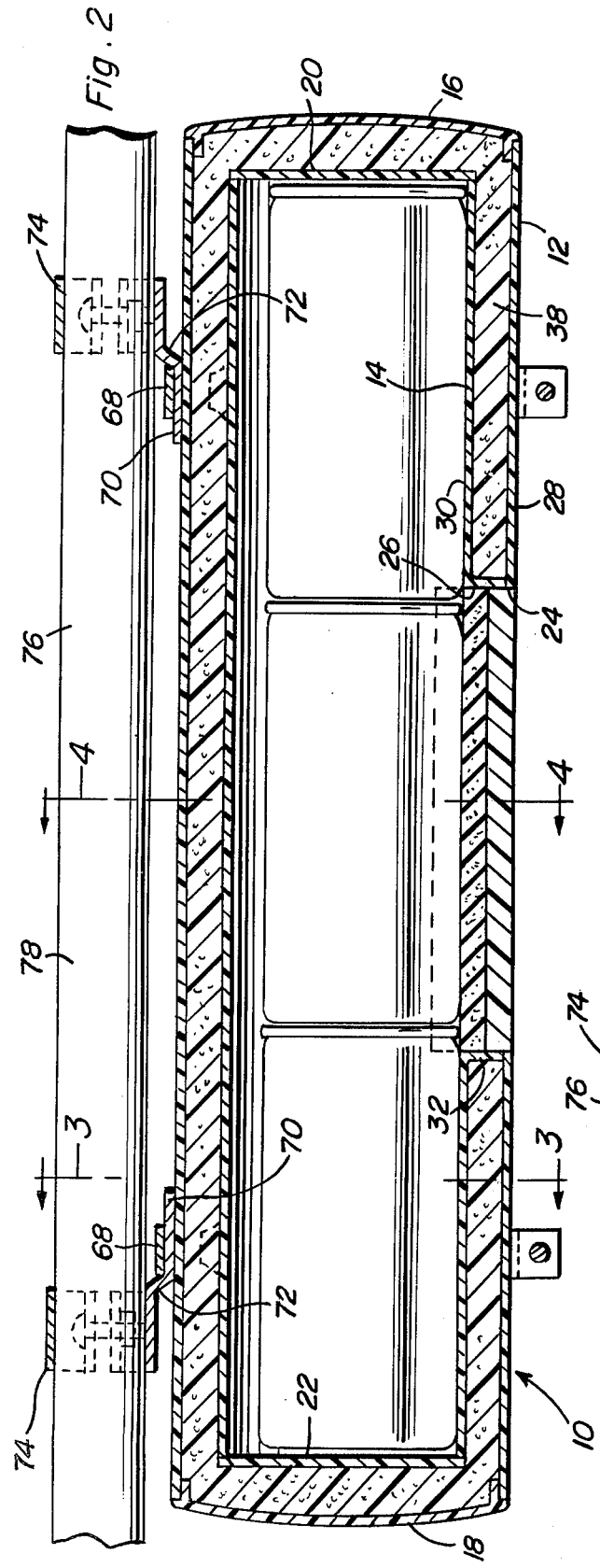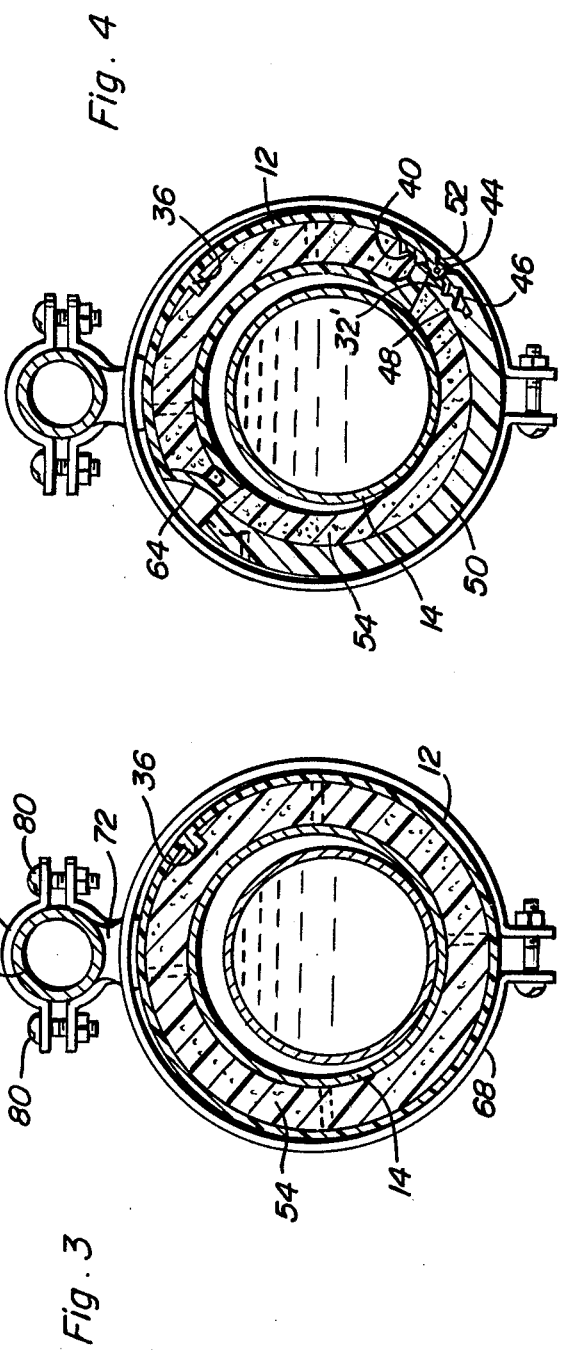

BICYCLE ATTACHED BEVERAGE CONTAINER CARRIER

BACKGROUND OF THE INVENTION

1. Field of the Invention

Various forms of insulated carriers or containers have been heretofore provided for receiving containers of beverage and maintaining those containers against rapid ambient heat transfer relative thereto. However, most insulated carriers for beverage containers are constructed for use by multiple persons and are, therefore, relatively large. Accordingly, a need exists for a personal size insulated carrier for beverage containers whereby beverage containers for a single person may be readily carried in heat transfer insulated manner.

2. Description of the Prior Art

While various forms of personal size beverage container carriers have been heretofore provided, most of these carriers have been adapted for use in specific environments and have not been desirably heat insulatively efficient. Examples of previous know insulated beverage container carriers and other devices including some of the general structural and operational features of the instant invention are disclosed in U.S. Pat. Nos. 1,975,428, 2,212,129, 3,316,040, 3,717,287 and 3,938,869.

BRIEF DESCRIPTION OF THE INVENTION

The beverage container carrier of the instant invention comprises an elongated cylindrical carrier including inner and outer shells having foam insulation disposed between the outer and inner surfaces of the inner and outer shells. An access opening is formed through corresponding mid-portions of the inner and outer shells and a partial cylindrical and insulative door is hingedly supported from the carrier and swingable into and out of position closing the aforementioned openings. The carrier is of a size to be provided with various forms of mounting structures and may, therefore, be readily carried in stationary positions on various different forms of vehicles as well as in various locations on body supported accessories.

The main object of this invention is to provide a carrier for containers of beverages and constructed in a manner whereby the containers of beverage therein will be insulated against rapid ambient heat transfer relative thereto.

Another object of this invention is to provide a carrier for beverage containers and constructed of a size to receive containers of beverages for a single person.

A further object of this invention is to provide a beverage container carrier of a shape adapting it to be readily stationarily supported relative to various vehicle portions as well as body worn accessories.

A final object of this invention to be specifically enumerated herein is to provide an insulated carrier for beverage containers constructed in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view of a beverage container carrier constructed in accordance with the present invention supported from one of the frame bars of a bicycle;

FIG. 2 is an enlarged, fragmentary, vertical, sectional view taken substantially upon the plane indicated by the section line 2—2 of FIG. 1;

FIG. 3 is a transverse, vertical, sectional view taken substantially upon the plane indicated by the section line 3—3 of FIG. 2;

FIG. 4 is a transverse, vertical, sectional view taken substantially upon the plane indicated by the section line 4—4 of FIG. 2;

FIG. 5 is a perspective view of the beverage container carrier with the door thereof in an open position;

FIG. 6 is is an exploded, perspective view of one of the mounting clamps utilized to support the carrier from the bicycle frame;

FIG. 7 is a perspective view of the inner shell portion of the carrier with the end walls of the inner shell removed; and FIG. 8 is a fragmentary, elevational view illustrating the manner in which a portion of the clamp structure illustrated in FIG. 6 may be utilized to mount the carrier from a planar support surface therefor.

DETAILED DESCRIPTION OF THE INVENTION

Referring now more specifically to the drawings, the numeral 10 generally designates the carrier of the instant invention. The carrier 10 includes outer and inner, long and short, large and small diameter shells 12 and 14. The shells 12 and 14 are loosely telescopingly related in concentric relation and the opposite ends of the shell 12 project endwise outwardly from the corresponding opposite ends of the shell 14. The shell 12 includes end walls 16 and 18 closing the opposite ends thereof outwardly of the corresponding ends of the shell 14 and the latter includes closure walls 20 and 22 closing the opposite ends thereof inwardly of the end walls 16 and 18.

The shells 12 and 14 have openings 24 and 26 of generally rectangular configuration formed through corresponding wall portions 28 and 30 thereof and the openings 24 and 26 are oriented longitudinally of the shells 12 and 14. The shell 14 includes generally radially outwardly projecting integral flange structure 32 extending outwardly from the portions of the shell 14 defining the opening 26 and the flange structure bridges the spacing between the wall portions 28 and 30 and abuts against the inner surfaces of those portions of the wall portion 28 extending about the opening 24.

The inner shell 14 includes longitudinally spaced sets of circumferentially spaced radially projecting and longitudinally extending ribs 34, see FIG. 7, projecting outwardly from the outer surfaces of the inner shell 14 and abutting the inner surfaces of the opposing portions of the outer shell 12, whereby the shells 12 and 14 are maintained in substantially coaxial relation. In addition, the outer shell 12 includes an inner radially inwardly projecting rib 36, see FIG. 3.

The spaces between the opposing wall portions of the inner and outer shells 12 and 14 is filled with urethane foam insulation 38 applied immediately prior to securement of the last end wall over the corresponding end of the shell 12.

The rib 36 maintains the cylindrical insulation 38 against angular displacement relative to the shell 12 and it may be seen from FIG. 4 of the drawings that one elongated and toothed leaf 40 of a piano hinge 44 including a second leaf 46 embedded in one longitudinal marginal portion 48 of a partial cylindrical closure wall 50 is received immediately inwardly of one longitudinal marginal edge 52 of the container 12 defining the opening 24 and the opposing portion 32' of the flange structure 32. After installation of the shell 14 within the shell 12 and prior to injection of the foam insulation 38 between the shells 12 and 14, the shells 12 and 14 are relatively rotated counterclockwise and clockwise, respectively, as viewed in FIG. 4 of the drawings, whereby the portion 32' of the flange structure 32 will be displaced into the opening 24. Thereafter, the leaf 40 of the hinge 44 is inserted in position and the containers 12 and 14 are then oppositely relatively rotated in order to position the portion 32' over the hinge leaf 40 in the manner illustrated in FIG. 4 of the drawings. Thereafter, the foam insulation 38 is injected into the space between the shells 12 and 14 and the last end wall is thereafter secured over the corresponding end of the shell 12. The partial cylindrical closure wall 50 including a foam rubber insulated inner liner 54 and opposite end portions 56 of the free swinging edge of the closure wall 50 are relieved in the manner illustrated in FIG. 5 and the opposing portions of the outer shell 12 are relied as at 58 in order to define cam lips 60 seatingly receivable in the relieved portions 56. The container 12 is constructed of stiff but slightly deformable material and is slotted as at 62 whereby the portions thereof supporting the cam lips 60 may be slightly outwardly flexed and the relieved portions 56 of the closure wall 50 may be slightly inwardly flexed to unseat the cam lips 60 from the relieved portions 56. In addition, the shell 14 defines a fingernail receiving indentation 64 by which fingernail pressure may be readily applied to the exposed central free edge portion 66 of the closure wall 50.

It may thus be seen that the free swinging edge of the closure wall 50 may be forced into snap fitted engagement with the cam lips 60 in order to releasably retain the closure wall 50 in the closed position and fingernail pressure may be applied to the surface 66 in order to swing the closure wall 50 from the closed position toward an open position thereof.

With attention now invited more specifically to FIGS. 1, 2 and 6 of the drawings, a pair of clamp strap assemblies 68 are clampingly secured about the opposite end portions of the carrier 10 and the clamp strap assemblies 68 clampingly secure laterally offset tongue portions 70 of clamp halves 72 to the outer shell 12. Second clamp halves 74 are provided and each pair of clamp halves 72 and 74 embracingly engage opposite side portions of a bar 76 of a bicycle frame 78 and each pair of clamp halves 72 and 74 are secured together by means of suitable fasteners 80. Also, it may be seen from FIG. 8 of the drawings that the clamp halves 74 may be discarded and the clamp halves 72 may be utilized to support the carrier 10 from a planar support member 82 to which the clamp halves 72 are secured by means of fasteners 84.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A small personal sized beverage container carrier for containing and insulating elongated beverage containers against ambient heat transfer relative thereto, said carrier comprising loosely telescopingly related inner and outer cylindrical shells defining an annular space between the opposing outer and inner surfaces thereof, said inner and outer cylindrical shells having radially registered substantially rectangular openings formed through corresponding wall portions thereof intermediate the opposite ends thereof and with said openings oriented longitudinally of said shells, one of said shells including generally radially projecting integral flange means extending about the corresponding opening and at least substantially bridging the radial spacing between said wall portions, said outer shell including end walls closing the opposite ends thereof outwardly of the corresponding ends of said inner shell, said inner shell including closure walls closing the opposite ends thereof inwardly of said end walls, insulation disposed between the opposing outer and inner surfaces of said shells and end and closure walls, a heat insulative partial cylindrical door hingedly supported from said carrier and swingable between open and closed positions providing unobstructed access through and closing said openings, one of the shells including radially extending circumferentially spaced ribs spanning the radial spacing between said one shell and the other shell.

2. The combination of claim 1 wherein said openings are formed in said shells centrally intermediate the opposite ends thereof.

3. The combination of claim 1 wherein said ribs are arranged in opposite end sets of circumferentially spaced ribs supported from said one shell.

4. The combination of claim 4 wherein said one one shell comprises said inner shell.

5. The combination of claim 1 including a pair of circumferential strap clamp assemblies extending about and clampingly engaged with opposite end portions of said outer shell, each of said strap clamp assemblies clampingly supporting mounting structure therefrom for support of said carrier from a suitable support structure therefor.

6. The combination of claim 5 wherein said mounting structure comprises clamp structure for removably clampingly engaging a cylindrical support member.

7. The combination of claim 5 wherein said mounting structure comprises a mount adapted for securement to a planar support surface.

* * * * *